(12) United States Patent
Cheng et al.

(10) Patent No.: US 12,231,592 B2
(45) Date of Patent: Feb. 18, 2025

(54) ELECTRONIC DEVICE

(71) Applicant: VIVO MOBILE COMMUNICATION CO., LTD., Dongguan (CN)

(72) Inventors: Zhiguo Cheng, Dongguan (CN); Sifan Lu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 313 days.

(21) Appl. No.: 17/865,367

(22) Filed: Jul. 14, 2022

(65) Prior Publication Data

US 2022/0353357 A1 Nov. 3, 2022

Related U.S. Application Data

(63) Continuation of application No. PCT/CN2021/071799, filed on Jan. 14, 2021.

(30) Foreign Application Priority Data

Jan. 16, 2020 (CN) .......................... 202010048144.X

(51) Int. Cl.
*H04M 1/02* (2006.01)

(52) U.S. Cl.
CPC ....... *H04M 1/0264* (2013.01); *H04M 1/0254* (2013.01)

(58) Field of Classification Search
None
See application file for complete search history.

(56) References Cited

U.S. PATENT DOCUMENTS

| | | | | |
|---|---|---|---|---|
| 2013/0150122 A1* | 6/2013 | Kulas | ................... | H04M 1/0264 |
| | | | | 455/556.1 |
| 2014/0268556 A1* | 9/2014 | Lam | ...................... | G06F 1/263 |
| | | | | 361/679.55 |
| 2016/0142867 A1* | 5/2016 | Kim | ........................ | H02J 50/10 |
| | | | | 320/108 |
| 2017/0208226 A1* | 7/2017 | Zhang | ................... | H04N 23/54 |
| 2020/0412853 A1* | 12/2020 | Zhu | ........................ | H04N 23/68 |
| 2021/0286157 A1* | 9/2021 | Eromaki | .............. | G03B 17/565 |

FOREIGN PATENT DOCUMENTS

| | | |
|---|---|---|
| CN | 104378465 A | 2/2015 |
| CN | 204376964 U | 6/2015 |
| CN | 106973130 A | 7/2017 |
| CN | 108040153 A | 5/2018 |
| CN | 108881567 A | 11/2018 |
| CN | 108965513 A | 12/2018 |
| CN | 208656817 U | 3/2019 |

(Continued)

OTHER PUBLICATIONS

European Search Report issued in related European Application No. 24151528.7, mailed Apr. 2, 2024, 20 pages.

(Continued)

*Primary Examiner* — Mohammed Rachedine
(74) *Attorney, Agent, or Firm* — IPX PLLC

(57) ABSTRACT

An electronic device is disclosed. The electronic device includes a body and a functional assembly. The functional assembly is detachably connected to the body. A first functional device provided with an open hole is arranged on the functional assembly.

11 Claims, 3 Drawing Sheets

(56) References Cited

FOREIGN PATENT DOCUMENTS

| | | | | | |
|---|---|---|---|---|---|
| CN | 111142621 A | * | 5/2020 | ........... | G06F 1/1615 |
| CN | 111245984 A | | 6/2020 | | |
| CN | 112073571 A | * | 12/2020 | | |
| EP | 3021563 A2 | | 5/2016 | | |
| EP | 3726337 A1 | * | 10/2020 | ........... | G06F 1/1626 |
| WO | 2018196149 A1 | | 11/2018 | | |
| WO | 2019235668 A1 | | 12/2019 | | |

OTHER PUBLICATIONS

Communication pursuant to Article 94(3) EPC issued in related European Application No. 21741842.5, mailed May 28, 2024, 8 pages.

Extended European Search Report issued in related European Application No. 21741842.5, mailed Sep. 12, 2023, 16 pages.

Partial supplimentary European Search Report issued in related European Application No. 21741842.5, mailed Jun. 13, 2023, 18 pages.

Apple, "Apple ipad Camera Connection Kit—iPad Accessories—Apple", Jul. 2016, 3 pages.

International Search Report issued in corresponding International Application No. PCT/CN2021/071799, mailed Mar. 25, 2021, 4 pages.

First Office Action issued in related Chinese Application No. 202010048144.X, mailed Sep. 25, 2020, 6 pages.

Second Office Action issued in related Chinese Application No. 202010048144.X, mailed May 17, 2021, 5 pages.

Office Action issued in related European Application No. 24151528.7, mailed Nov. 14, 2024, 10 pages.

Office Action issued in related European Application No. 24151528.7, mailed Dec. 13, 2024, 10 pages.

Satechi: "Instructional Video—Satechi Bluetooth Home Button",, Mar. 17, 2015, XP093215130.

* cited by examiner

ELECTRONIC DEVICE

CROSS-REFERENCE TO RELATED APPLICATIONS

This application is a continuation of International Application No. PCT/CN2021/071799, filed on Jan. 14, 2021, which claims priority to Chinese Patent Application No. 202010048144.X, filed with the China National Intellectual Property Administration on Jan. 16, 2020. The entire contents of each of the above-referenced applications are expressly incorporated herein by reference.

TECHNICAL FIELD

The present disclosure relates to the technical field of communication devices, and in particular, to an electronic device.

BACKGROUND

In recent years, electronic devices such as smartphones are developing for a full-screen and holeless structure. In the related art, it is difficult to arrange components such as a camera, a control button, a charging interface, a receiver, and an SIM card on an electronic device having a full-screen and holeless structure.

The above components occupy some certain assembly spaces or require special holes for arrangement. For example, the camera occupies a space on a display screen of the electronic device, resulting in a notch. Thus, an appearance of the product is affected to some extent. Most control buttons are pressure-touch buttons, and occupy a part of the screen. As a result, a real full-screen structural design of electronic devices cannot be achieved. Arrangement of the components such as the charging interface, the receiver, and the SIM card requires holes on the electronic device, resulting in poor dustproof and liquid-proof performance of the electronic device.

SUMMARY

An object of the present disclosure is to provide a new technical solution of an electronic device.

Embodiments of the present disclosure provide an electronic device, including:
  a body and a functional assembly, where the functional assembly is detachably connected to the body; and
  a first functional device provided with an open hole is arranged on the functional assembly.

The inventor of the present disclosure found that in the prior art, it is difficult to arrange functional components such as a camera on most electronic devices having a full-screen and holeless structure, and thus a real full-screen structural design cannot be achieved.

According to the electronic device provided in the embodiments of the present disclosure, the functional assembly is arranged for the body of the electronic device, and the functional assembly has functional devices such as an image capturing apparatus and a receiver. The functional assembly may be put into use only by connecting the functional assembly directly to the body of the electronic device. Disassembly of the functional assembly from and assembly of the functional assembly to the body of the electronic device are very convenient. The present disclosure helps realize a real full-screen and holeless design of electronic devices, and has desirable dustproof and liquid-proof performance. In addition, a volume of the electronic device body can be reduced, thereby facilitating carrying.

The technical task to be achieved or the technical problem to be resolved by the present disclosure is never thought or expected by those skilled in the art. Therefore, the present disclosure is a new technical solution.

Other features and advantages of the present disclosure become apparent from the following detailed description of exemplary embodiments of the present disclosure with reference to the accompanying drawings.

BRIEF DESCRIPTION OF THE DRAWINGS

The accompanying drawings, which are incorporated in and constitute a part of the specification, illustrate embodiments of this disclosure and together with the description serve to explain the principles of the present disclosure.

DETAILED DESCRIPTION

Figure 1:
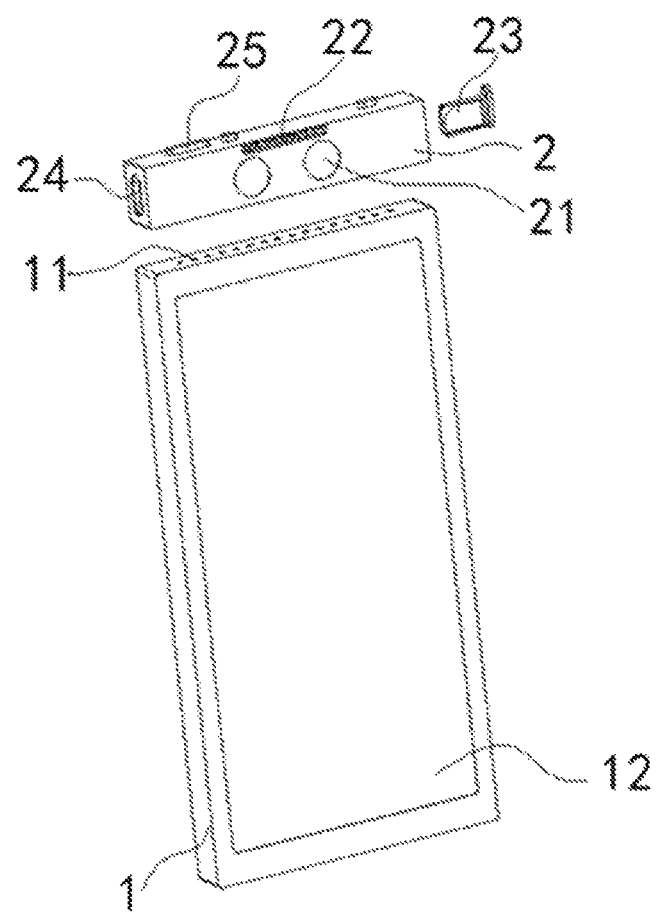
FIG. 1 is a possible schematic structural diagram of an electronic device according to an embodiment of the present disclosure.

Various exemplary embodiments of the present disclosure are described in detail with reference to the accompanying drawings. It should be noted that: unless otherwise specified, the relative deployment of the components and steps, the numerical expression, and values described in the embodiments do not limit the scope of the present disclosure.

In fact, the following descriptions of at least one exemplary embodiment are merely illustrative, and in no way constitute any limitation on the present disclosure and application or use of the present disclosure.

Technologies, methods, and devices known to a person of ordinary skill in the art may not be discussed in detail, but in proper circumstances, the technologies, methods, and devices shall be regarded as a part of this specification.

In all examples shown and discussed herein, any specific value should be construed as merely exemplary and not as limitations. Therefore, other examples of exemplary embodiments may have different values.

It should be noted that: similar reference numerals or letters in the accompanying drawings indicate similar items. Therefore, once an item is defined in one accompanying drawing, the item does not need to be further discussed in the subsequent accompanying drawings.

The embodiments of the present disclosure provide an electronic device, which can realize a full-screen and holeless structural design in a real sense. The electronic device provided in the present disclosure may be, for example, different types of electronic products such as smart phones, smart watches, tablet computers, VR devices, or AR devices, which is not limited in the present disclosure.

As shown in FIG. 1, the electronic device provided in the embodiments of the present disclosure includes a body 1 and a functional assembly 2. The functional assembly 2 is detachably connected to the body 1. The functional assembly 2 includes a housing, and a first functional device 21 provided with an open hole is arranged on the housing. In some embodiments, the body 1 includes a display screen, for example, a first screen 12. The body may further include other display screens other than the first screen, which is not specifically limited in the embodiments of the present disclosure. In some embodiments, the first screen 12 on the body 1 is a full-screen and holeless structure.

In the electronic device provided in the embodiments of the present disclosure, a corresponding functional assembly 2 is arranged for the body 1. The first functional device 21 provided with an open hole is directly integrated on the functional assembly 2, instead of being integrated on the body 1 of the electronic device. The first functional device 21 provided with an open hole may be put into use only by connecting the functional assembly 2 directly to the body 1. The first functional device 21 provided with an open hole may be removed from use only by detaching the functional assembly 2 from the body 1. It should be noted that, after the functional assembly 2 is disassembled from the body 1, the body 1 can be used alone without normal functions such as watching videos, playing games, and surfing the Internet being affected. The functional assembly 2 can be conveniently assembled to and disassembled from the body 1 without causing trouble to users. The present disclosure helps realize a real full-screen and holeless design of the display screen 12 on the electronic device, and brings desirable dustproof and liquid-proof performance for the display screen. In addition, the body 1 has a small volume and can be conveniently carried.

In the electronic device provided in the embodiments of the present disclosure, the first functional device 21 on the functional assembly 2 may be, for example, an image capturing apparatus, a receiver, or a data interface. For example, the first functional device is the image capturing apparatus. One image capturing apparatus may be arranged, or a plurality of image capturing apparatuses may be arranged as required. Those skilled in the art may make adjustments according to an actual situation. This is not limited. When a plurality of image capturing apparatuses are arranged on the functional assembly 2, those skilled in the art may properly adjust the arrangement of the plurality of image capturing apparatuses as required. In the present disclosure, the body 1 of the electronic device does not have an image capturing apparatus or other functional devices thereon, which helps realize full-screen display of the display screen 12 on the electronic device. The present disclosure is different from the existing related art. In the existing related art, the image capturing apparatus such as a camera is arranged inside the housing of the electronic device. In an existing solution, the camera is usually extended out to perform photographing during use and is retracted when not used. Although a full screen is realized, in the structure, heat generated by the camera during working accumulates and is difficult to dissipate which tends to result in a high local temperature. As a result, a use effect is affected, and a service life of the camera is shortened.

In the electronic device provided in the embodiments of the present disclosure, the housing of the functional assembly 2 may be, for example, a cube-shaped structure, to facilitate connection to the body 1. The housing of the functional assembly 2 may be flexibly designed as other structural shapes according to specific situations, as long as the functional assembly can be conveniently connected to the body 1. The housing is neither limited to the cube-shaped structure nor limited in the present disclosure.

In addition, the housing of the functional assembly 2 may be made of a metal material or a plastic material with high strength. For example, the housing of the functional assembly 2 may be made of a stainless steel material or an aluminum alloy material, to increase durability and a service life thereof.

In the electronic device provided in the embodiments of the present disclosure, the functional assembly 2 is detachably connected to the body 1.

In some embodiments, the functional assembly 2 is connected to the body 1 magnetically. The magnetic connection is relatively simple, and does not require complex mechanical structures. In particular, connection holes are not required to be provided on the body 1, which helps realize a holeless structural design. Moreover, the functional assembly 2 can be easily and effortlessly assembled to and disassembled from the body 1.

In an exemplary embodiment of the present disclosure, a magnetic connector is arranged on the housing of the functional assembly 2, and a magnetic groove 11 matching the magnetic connector is provided on the body 1. The magnetic connector and the magnetic groove 11 are both made of a magnetic material. When the magnetic joint approaches the magnetic groove 11, the magnetic joint and the magnetic groove can be attracted together to realize connection between the magnetic connector and the magnetic groove. In this way, the functional assembly 2 can be connected to the body 1.

In an exemplary implementation of the present disclosure, a magnetic connector is arranged on the body 1, and a magnetic groove matching the magnetic connector is provided on the housing of the functional assembly 2. Likewise, the magnetic connector and the magnetic groove 11 are both made of a magnetic material. When the magnetic joint approaches the magnetic groove 11, the magnetic joint and the magnetic groove can be attracted together to realize connection between the magnetic connector and the magnetic groove. In this way, the functional assembly 2 can be connected to the body 1.

The two manners are not limited in the present disclosure, and those skilled in the art may make flexible adjustments as required.

In the present disclosure, the magnetic connector may have varying forms. In order to cause the magnetic connector and the magnetic groove 11 to be mated with each other, a shape of the magnetic groove 11 is required to match a shape of the magnetic connector.

In an exemplary embodiment of the present disclosure, the magnetic connector has an overall structure in the shape of a long strip. In this case, the magnetic groove is a groove in the shape of a long strip matching the magnetic connector in shape. For example, the magnetic connector may be a rectangular structure in the shape of a long strip, or may be a wavy structure in the shape of a long strip. This is not limited in the present disclosure.

In an exemplary embodiment of the present disclosure, the magnetic connector is in a shape of a convex point that protrudes outward. A plurality of magnetic connectors may be arranged. The plurality of magnetic connectors are arranged in at least one row on the housing of the functional assembly 2, and the plurality of magnetic connectors are evenly distributed. In this case, as shown in FIG. 1, a plurality of magnetic grooves 11 are correspondingly arranged, and each magnetic groove 11 is a pit that matches the convex point structure. For example, the magnetic connector may be in a shape of a circular convex point, a triangular convex point, a quadrilateral convex point, an elliptical convex point, a semicircular convex point, or the like. This is not limited in the present disclosure.

The magnetic connector and the magnetic groove 11 designed in the present disclosure not only have the connection function, but also have a fixing function, so that stability of the connection between the body 1 and the functional assembly 2 can be increased. That is to say, after the functional assembly 2 is connected to the body 1, the functional assembly 2 can be firmly combined with the body 1, and the functional assembly 2 is unlikely to fall off.

Moreover, in addition to the magnetic connection between the functional assembly 2 and the body 1, connection may alternatively be realized between the functional assembly and the body by a slot and a buckle. In an exemplary embodiment of the present disclosure, a slot structure is arranged on the functional assembly 2, and a buckle structure is arranged on the body 1. When the functional assembly 2 is to be connected to the body 1, the buckle structure on the body 1 may be mechanically connected to the slot structure on the functional assembly 2. The connection is stable, realizes easy disassembly and assembly, and requires no open holes on the body 1.

In addition, the functional assembly 2 and the body 1 may be detachably connected by a connecting member. In an exemplary embodiment of the present disclosure, a mounting hole is provided on the functional assembly 2, the mounting hole has a threaded structure, and a threaded connecting member is arranged on the body 1. When the functional assembly 2 is to be connected to the body 1, the threaded connecting member on the body 1 may be threadedly connected to the mounting hole on the functional assembly 2, so that the detachable connection between the functional assembly 2 and the body 1 can be realized.

It should be noted that the detachable connection between the functional assembly 2 and the body 1 is not limited to the above, and those skilled in the art may make flexible adjustments as required. This is not limited.

In the electronic device provided in the embodiments of the present disclosure, the body 1 and the functional assembly 2 may be connected by a signal. In some embodiments, the body 1 and the functional assembly 2 are connected by a Bluetooth signal without requiring other signal connection lines. Therefore, complicated wiring is avoided. The body 1 and the functional assembly 2 may be connected in other wireless connection manners well known to those skilled in the art. Those skilled in the art may make flexible selection according to actual requirements. This is not limited in the present disclosure. After the body 1 and the functional assembly 2 are connected by a signal, a function of controlling each other can be realized.

In some embodiments, in the electronic device provided in the embodiments of the present disclosure, a first power supply module may be arranged on the functional assembly 2. When the functional assembly 2 is used alone, the first functional device 21 is powered by the first power supply module to ensure the normal use of the first functional device 21.

In some embodiments, in the electronic device provided in the embodiments of the present disclosure, a second power supply module may be arranged on the body 1. When the body 1 is connected to the functional assembly 2, the first functional device 21 is powered by the second power supply module.

The first power supply module and the second power supply module both may be rechargeable batteries, so that power can be replenished in time for the first power supply module and the second power supply module without frequent replacement. Therefore, the use is more convenient.

Generally, a control button is further required to be arranged on the electronic device. The control button has functions such as controlling an application program to return to a main interface, which is of significance. For an electronic device having a full-screen structure, arranging a control button on the electronic device occupies a certain space on the screen. In some embodiments, in the electronic device provided in the embodiments of the present disclosure, a control button 25 may be arranged on the functional assembly 2 instead of directly on the body 1 of the electronic device, that is, the control button 25 is separated from the body 1.

In an exemplary embodiment of the present disclosure, the functional assembly 2 further includes a control button 25, and the control button 25 is arranged on a top of the functional assembly 2. Such a design can facilitate operations for a user more effectively. For example, the control button 25 may be a physical button. In another example, the control button 25 is a pressure touch button. Compared with the pressure touch button, the physical button has an advantage of obvious tactile feedback. During actual application, an arrangement position of the control button 25 on the functional assembly 2 may be flexibly adjusted according to specific requirements, and is not limited to a top position. The arrangement position may be properly set according to operation requirements of a user, to facilitate operations for the user. This is not limited.

In some embodiments, in the electronic device provided in the embodiments of the present disclosure, a first image capturing apparatus and a receiver 22 are arranged on the functional assembly 2, and are located on a same side of the functional assembly 2. For example, when the electronic device has a call function, a receiver is usually required to be arranged on the electronic device. In the current full-screen and holeless structure, a function of the receiver may be realized by screen sound. However, sound transmission by screen vibration is likely to cause poor privacy of sounds. In particular, other people close to the user can easily hear content of a call. Therefore, in the present disclosure, the receiver 22 is separated from the body 1 of the electronic device, and the receiver 22 is arranged on the functional assembly 2. In some embodiments, the receiver 24 and the image capturing apparatus 21 are located on a same side. The receiver and the image capturing apparatus may alternatively be located on different sides of the functional assembly. Those skilled in the art may make flexible adjustments according to actual requirements. This is not limited.

Currently, for some electronic devices having a full-screen and holeless structure, charging is usually realized magnetically or wirelessly. However, a disadvantage is that a particular magnetic charging apparatus or wireless charging apparatus is required, and it is difficult to find an alternative charging cable for charging. Therefore, the above manner cannot be universally used.

Figure 2:
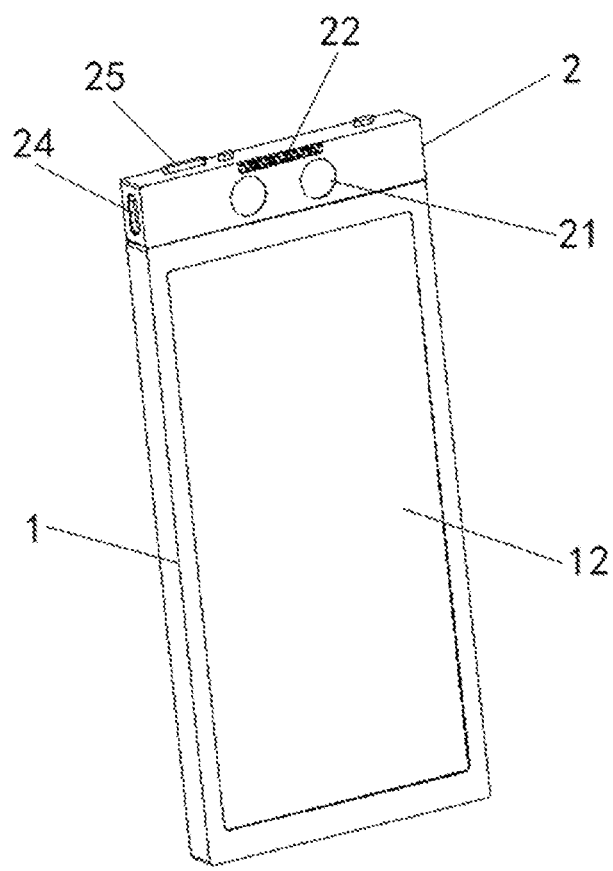
FIG. 2 is a use status diagram of the electronic device according to an embodiment of the present disclosure.
Figure 3:
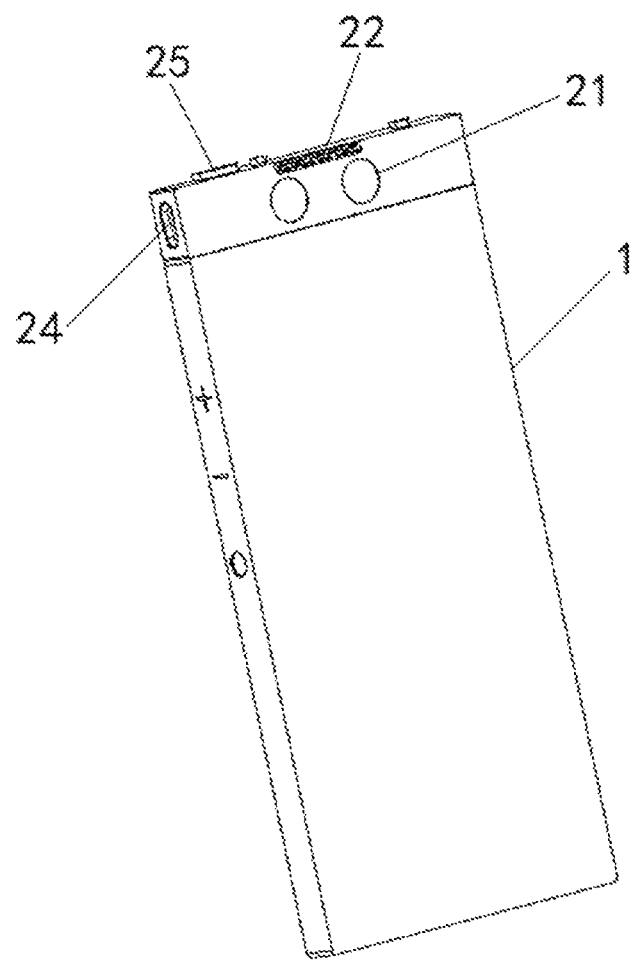
FIG. 3 is another use status diagram of the electronic device according to an embodiment of the present disclosure.

In the electronic device provided in the embodiments of the present disclosure, as shown in FIG. 1 to FIG. 3, at least one first data interface 24 is arranged on the functional assembly 2. The first data interface 24 is arranged on a side surface of the functional assembly 2. A second data interface (not shown in FIG. 1 to FIG. 3) is arranged on the body 1. When the body 1 is connected to the functional assembly 2, the first data interface 24 is connected to the second data interface.

It should be noted that, a quantity of first data interfaces 24 that are arranged may be flexibly adjusted as required.

The first data interface 24 may be arranged, for example, on a side surface of the functional assembly 2. The first data interface 24 may be arranged at other positions on the functional assembly 2, as long as the first data interface does not affect other components and can facilitate use for a user. In addition, the first data interface 24 may be a USB interface, a type-c interface, or other frequently used data interfaces. The arrangement of the first data interface 24 facilitates charging of the body 1 or data transmission such as import and export.

When the body 1 has a communication function, for example, the body is a mobile phone, a built-in SIM card is usually required to realize communication with the outside. In order to realize a holeless design for the mobile phone, currently, an e-SIM card may be used. However, the e-SIM card requires special support from an operator, and currently is not widely used. In an exemplary embodiment of the present disclosure, as shown in FIG. 1, the functional assembly 2 includes a SIM card tray 23. The SIM card tray 23 is not arranged in the body 1, and therefore does not require open holes on the body 1. A slot for mounting the SIM card is provided on the SIM card tray 23. One or more slots for mounting the SIM card may be arranged to adapt to a dual-card design. An elastic member is arranged on at least one side of the SIM card tray. The elastic member is configured to eject the SIM card tray out of the functional assembly or insert the SIM card tray into the functional assembly.

In some embodiments, in the electronic device provided in the embodiments of the present disclosure, a second image capturing apparatus may be further arranged on the functional assembly 2. For example, the second image capturing apparatus is located on a first side of the functional assembly 2.

As shown in FIG. 2, when the body 1 is connected to the functional assembly 2 in a first connection manner, the second image capturing apparatus faces a same direction as a first screen on the body 1. As shown in FIG. 3, when the body 1 is connected to the functional assembly 2 in a second connection manner, the second image capturing apparatus faces a direction opposite to that of a first screen on the body 1. With the design of the present disclosure, the second image capturing apparatus may be switched as a front camera or a rear camera as required, that is, can be freely switched between the front camera and the rear camera. In some embodiments, the electronic device may include only one display screen such as the first display screen, or may include additional display screens, such as a second screen. A specific number of the display screens is not specifically limited in the embodiments of the present disclosure.

In some embodiments, the body 1 of the electronic device of the present disclosure is a full-screen and holeless structure.

Although some exemplary embodiments of the present disclosure have been described in detail by using examples, a person skilled in the art should understand that the foregoing examples are only provided for illustration and not for the purpose of limiting the scope of the present disclosure. A person skilled in the art should understand that modifications may be made to the foregoing embodiments without departing from the scope and spirit of the present disclosure. The scope of the present disclosure is defined by the appended claims.

What is claimed is:

1. An electronic device, comprising:
a body; and
a functional assembly, wherein the functional assembly is detachably connected to the body,
wherein a first functional device provided with an open hole is arranged on the functional assembly, and
wherein the first functional device comprises a receiver for a sound transmission from the electronic device.

2. The electronic device according to claim 1, wherein the functional assembly is magnetically connected to the body.

3. The electronic device according to claim 1, wherein a magnetic connector is arranged on a housing of the functional assembly, and a magnetic groove is provided on the body; or
the magnetic connector is arranged on the body, and the magnetic groove is provided on the housing of the functional assembly.

4. The electronic device according to claim 3, wherein the magnetic connector is in a shape of a long strip, and a shape of the magnetic groove matches the shape of the magnetic connector; or
the magnetic connector is in a shape of a convex point that protrudes outward, a plurality of magnetic connectors are arranged, and the shape of the magnetic groove matches the shape of the magnetic connector.

5. The electronic device according to claim 1, wherein a first power supply module is arranged on the functional assembly, and the first functional device is powered by the first power supply module.

6. The electronic device according to claim 1, wherein a second power supply module is arranged on the body; and
when the body is connected to the functional assembly, the first functional device is powered by the second power supply module.

7. The electronic device according to claim 1, wherein the functional assembly further comprises a control button arranged on a top of the functional assembly.

8. The electronic device according to claim 1, wherein a first image capturing apparatus is arranged on the functional assembly, and the first image capturing apparatus and the receiver are located on a same side of the functional assembly.

9. The electronic device according to claim 1, wherein at least one first data interface is arranged on the functional assembly, and the first data interface is arranged on a side surface of the functional assembly; and
a second data interface is arranged on the body, and when the body is connected to the functional assembly, the first data interface is connected to the second data interface.

10. The electronic device according to claim 1, wherein the body is a holeless structure.

11. The electronic device according to claim 1, wherein a second image capturing apparatus is arranged on the functional assembly and is arranged on a first side of the functional assembly;
when the body is connected to the functional assembly in a first connection manner, the second image capturing apparatus faces a same direction as a first screen on the body; or
when the body is connected to the functional assembly in a second connection manner, the second image capturing apparatus faces a direction opposite to that of the first screen on the body.

* * * * *